US006028680A

United States Patent [19]

Seo

[11] Patent Number: 6,028,680
[45] Date of Patent: Feb. 22, 2000

[54] APPARATUS AND METHOD FOR RECORDING RECEIVED RESULTS IN FACSIMILE

[75] Inventor: Seok-Hwan Seo, Suwon, Rep. of Korea

[73] Assignee: Samsung Electronics Co., Ltd., Suwon, Rep. of Korea

[21] Appl. No.: 08/777,146

[22] Filed: Dec. 30, 1996

[30] Foreign Application Priority Data

Dec. 30, 1995 [KR] Rep. of Korea ...................... 95/67786

[51] Int. Cl.[7] .................................................. H04N 1/00
[52] U.S. Cl. ......................... 358/440; 358/434; 358/435; 358/436; 358/437; 358/438; 358/439; 358/468; 358/470
[58] Field of Search .................................... 358/440, 434, 358/435, 436, 437, 438, 439, 468, 470

[56] References Cited

U.S. PATENT DOCUMENTS

| | | | |
|---|---|---|---|
| 3,676,846 | 7/1972 | Busch | 340/146.1 |
| 4,811,111 | 3/1989 | Kurokawa | 358/440 |
| 4,827,349 | 5/1989 | Ogata et al. | 358/280 |
| 5,021,889 | 6/1991 | Yamamoto | 358/440 |
| 5,040,206 | 8/1991 | Tokumasu et al. | 379/85 |
| 5,113,492 | 5/1992 | Ariki et al. | 707/520 |
| 5,206,743 | 4/1993 | Hochman et al. | 358/440 |
| 5,237,430 | 8/1993 | Sakurai | 358/444 |
| 5,262,851 | 11/1993 | Nakatani et al. | 358/437 |
| 5,280,519 | 1/1994 | Nakajima et al. | 379/93 |
| 5,282,059 | 1/1994 | Fukushima et al. | 358/426 |
| 5,293,253 | 3/1994 | Kida et al. | 358/439 |
| 5,307,178 | 4/1994 | Yoneda | 358/434 |
| 5,349,447 | 9/1994 | Kuwahara et al. | 358/444 |
| 5,384,836 | 1/1995 | Otsuka | 358/440 |
| 5,396,342 | 3/1995 | Meyer | 358/442 |
| 5,452,460 | 9/1995 | Distelberg et al. | 395/650 |
| 5,465,326 | 11/1995 | Sawada | 358/438 |
| 5,563,932 | 10/1996 | Tachibana et al. | 379/100 |
| 5,585,938 | 12/1996 | Imamura | 358/434 |

*Primary Examiner*—Christopher S. Kelley
*Assistant Examiner*—Sheela Chawan
*Attorney, Agent, or Firm*—Robert E. Bushnell, Esq.

[57] ABSTRACT

A facsimile machine is disclosed that can record and print identifying information pertaining to the transmitter and the transmission of a facsimile message. The invention accommodates and allows for identifying information in many languages, accommodating telephone numbers that are exceptionally long as having more than 20 characters. These features are realized by finding the Transmitting Terminal Identification (TTI) in a transmitted message and forming a bit map therefrom. As a result, terminal identification can be communicated and recorded in virtually any language and can contain information up to the scan length instead of being restricted to a smaller number of characters.

3 Claims, 7 Drawing Sheets

| NO. | FAX NUMBER | RCVD | TIME | TIME | MODE | PAGE | RESULTS |
|---|---|---|---|---|---|---|---|
| 000 | | 07-03 | 10:20 | 02'00" | ECM | 03 | OK |
| 001 | 5555 | 07-03 | 11:43 | 00'00" | G3 | 00 | STOP PRESSED |
| 002 | #095##08980995000089 | 07-03 | 11:44 | 00'53" | G3 | 01 | OK |
| 003 | | 07-03 | 13:33 | 00'00" | G3 | 00 | STOP PRESSED |

*Fig. 2*

7月29日(±) 21:10 FROM !!!!!!!!!!!!    PAGE. 1

7月10日 13:39 FROM: A B C D E F G H I J 8569456789045 7856965 TO:243    PAGE: 1

23-FEB-94 07:16 SAMSUNG ELEC. SEOUL KOREA DONGUK HWANG ☎ 82 2 751 6499 P01

AUG-30 11 16:18 FROM: PLAIN PAPER FAX TEAM 82-2-751-6214 TO:0172411 PAGE:01

02-22-94 02:14PM FROM dBS HQ TO SAMSUNG HQ P001/001

*Fig. 3*

APPARATUS AND METHOD FOR RECORDING RECEIVED RESULTS IN FACSIMILE

CLAIM OF PRIORITY

This application makes reference to, incorporates the same herein, and claims all benefits accruing under 35 U.S.C. §119 arising from an application for Apparatus and Method For Recording Received Results In Facsimile earlier filed in the Korean Industrial Property Office on Dec. 30, 1995 and there duly assigned Ser. No. 67786/1995.

FIELD OF THE INVENTION

The present invention relates to an apparatus and method for recording the received results in a facsimile, in which a TTI (transmitting terminal identification) information is captured from the messages transmitted from a transmitting end, and the captured TTI is recorded as a received result.

BACKGROUND OF THE INVENTION

Generally, a facsimile has a function of storing or visibly printing the received results after receiving a text, so that the user may confirm the received results. FIG. 2 illustrates an example of a received result of a recording pattern of a conventional facsimile. Recorded are a series of various data, such as event numbers, transmitting facsimile numbers, received times, kinds of communication, and communications results. This recording pattern may be different depending on the manufacturer of the facsimile machine, and the number or kinds of information included may also be different.

When reception has begun, a receiving start number is stored into a static random access memory (SRAM), and a TSI (transmitting subscriber identification) of the transmitting end is stored in American standard code for information interchange (ASCII) code. Then the receiving start time is read from a time chip so that it is stored. Thereafter, at the time of the completion of the receiving, the total time period for the receiving, the total received pages and the received results are stored. This series of the information is recorded into the SRAM with a backup.

Each time, when a receiving event occurs, the above procedure is undergone so that the content of the SRAM would become updated. Then the user can visually print the result messages, i.e., the contents of the SRAM. The TTI information is transmitted in most facsimiles, and the TSI information is transmitted through the telephone number and telephone line to the receiving end.

As the receiving results are repetitively stored, the SRAM will become full. In order to prevent the overflow of the SRAM, if a certain number is exceeded, the earliest items are deleted, and the most recent items are preserved. However, if the receiving results are recorded in this manner, the telephone numbers of the transmitters are recorded only in ASCII codes. With the ASCII code, only English telephone numbers and English identifications (IDs) can be recorded, and languages of other nations cannot be recorded. Further, the ASCII code is limited to 20 positions. Therefore, in the case where the transmitter's own telephone number exceeds 20 positions, only 20 characters are transmitted through the TSI, and therefore, the whole facsimile (telephone) number cannot be transmitted. Further, since only either the transmitter's telephone number or ID is recorded, there is the possibility that the receiving person cannot exactly recognize who the transmitter is. In the case where only the telephone number is recorded, the receiving person should know all the information pertaining to the transmitting party.

U.S. Pat. No. 5,021,889 for a Facsimile Apparatus to Yamamoto discloses TTI storage in a variety of languages. Thus, TTI header information may be stored in characters other than English at the request of the user.

U.S. Pat. No. 5,465,326 for a Mixed-Mode Transmission Control Apparatus For Adding An Identification Block To Mixed Mode Data to Sawada discloses a how terminal identifying data can be sent and displayed in either Japanese or English. Block TTI is used to accomplish the task.

U.S. Pat. No. 5,237,430 disclose a Facsimile Apparatus which Stores Image Data In A Bulk Storage Device to Sakurai discloses a means and device for preserving image data from being erased. The invention stores image data in bulk storage where it can be permanently preserved.

What is needed is a single facsimile device that not only records image data in languages other than ASCII English, but allows for the storage of telephone numbers greater than 20 characters, that records, in addition to the telephone number, other identifying information about the sender, as well as prevents recorded image data from being erased when the memory area becomes overflowed.

SUMMARY OF THE INVENTION

The present invention is intended to overcome the above described disadvantages.

Therefore it is an object of the present invention to provide an apparatus and a method for recording the received results in a facsimile, in which the facsimile number and ID can be recorded in any language.

It is another object of the present invention to provide an apparatus and a method for recording the received results in a facsimile, in which all the characters of the facsimile number can be recorded.

It is still another object of the present invention to provide an apparatus and a method for recording the received results in a facsimile, in which both the telephone number and ID of the transmitter are recorded, so that the receiving person can easily recognize the transmitting party, thereby providing a convenience.

It is yet another object to provide an image data recording routine that allows for the storage of telephone numbers containing more than 20 characters.

In achieving the above objects, the present invention is characterized in that the received results are captured from the TTI of the actual facsimile data of the transmitting end so as to store them in the form of bit-map data, thereby obtaining transmitter information as much as the maximum scan width. Further, in the present invention, all kinds of letters and numerals or graphics can be recorded.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 2 illustrates a received result recording pattern of the earlier facsimile;

FIG. 3 illustrates a received result recording pattern of the facsimile according to the present invention;

DETAILED DESCRIPTION OF THE INVENTION

Figure 1:
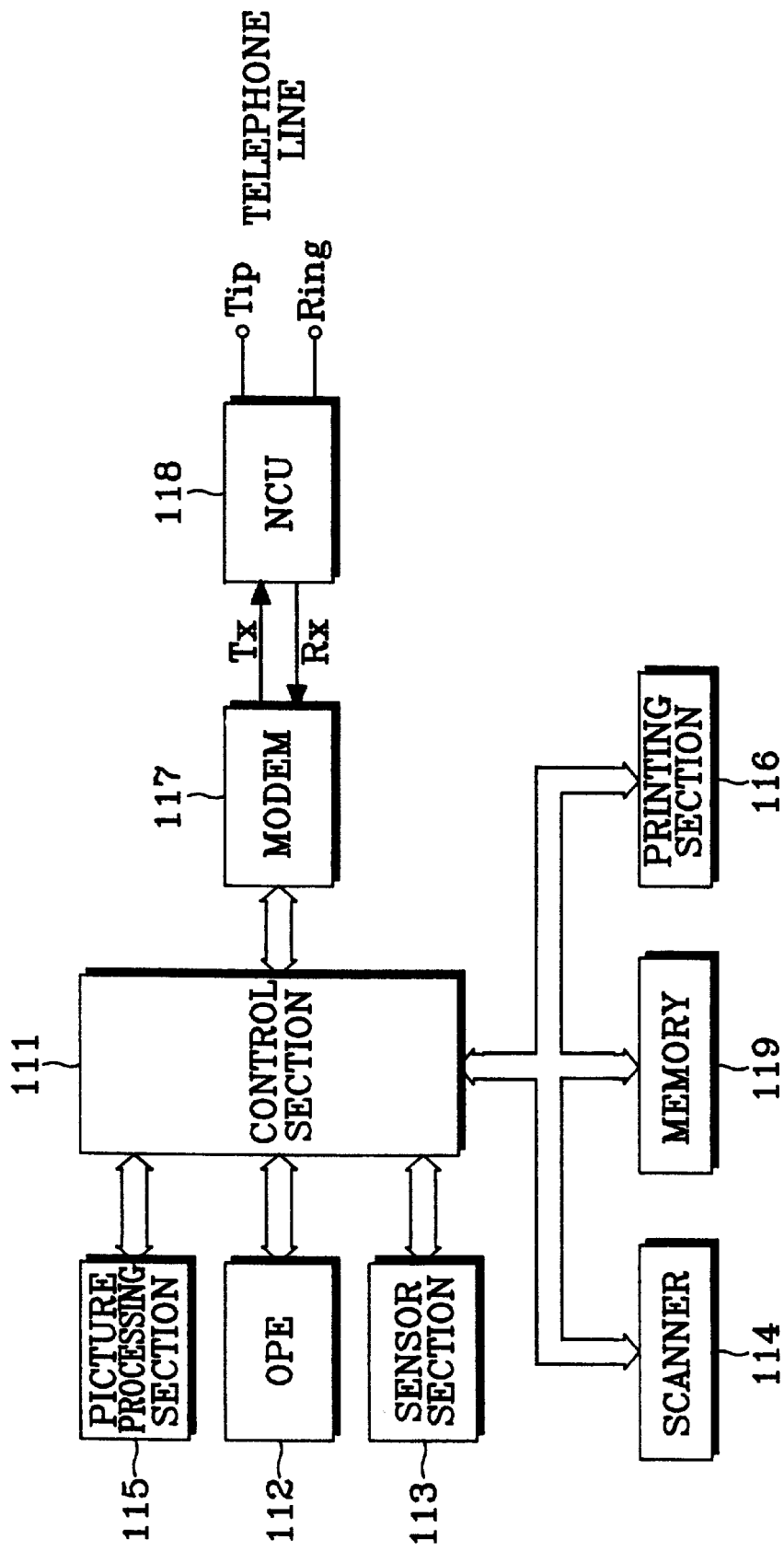
FIG. 1 illustrates the constitution of the general facsimile to which the present invention is to be applied.

FIG. 1 illustrates a general facsimile to which the present invention is to be applied. Referring to FIG. 1, a control section 111 controls the total operations such as a transmitting mode, a receiving mode and a copying mode in accordance with a pre-set program. Further, the control section 111 has a program memory and a data memory, or is connected to an external memory 119. The program memory stores the program of the present invention, while the data memory temporarily stores the data produced during the execution of the program. An OPE (operating panel) 112 includes a key inputting means and a display means. The key inputting means of the OPE 112 generates data for the keys which the user pushes for designating modes and for executions of the designated modes, while the generated data are output to the control section 111. The display means of the OPE 112 displays the operation state of the system during the time when the control section 111 executes the designated modes. A sensor section 113 senses the existence or absence of a text paper, and the exhaustion of the printing paper, while the sensed status signals are outputted to the control section 111. A scanner 114 moves the inputted text paper, scans the images of the text paper so as to output them as digital data. An image processing section 115 converts the image signals of the scanner 114 to digital data. A printing section 116 prints the image data of the image processing section 115 onto a printing paper during the execution of a receiving mode or a copying mode under the control of control section 111. A modem 117 modulates the image data of the image processing section 115 in such a manner as to be fit to the facsimile standard so as to transmit the modulated data during the transmitting mode under the control of the control section 111. During the receiving mode, the modem 117 demodulates the incoming data (incoming through a transmitting line) to the original form, so that the image processing section 115 could process them. An NCU (network control unit) 118 forms a transmitting and receiving path between a telephone line (tip and ring) and the modem 117 under the control of the control section 111.

Figure 4:
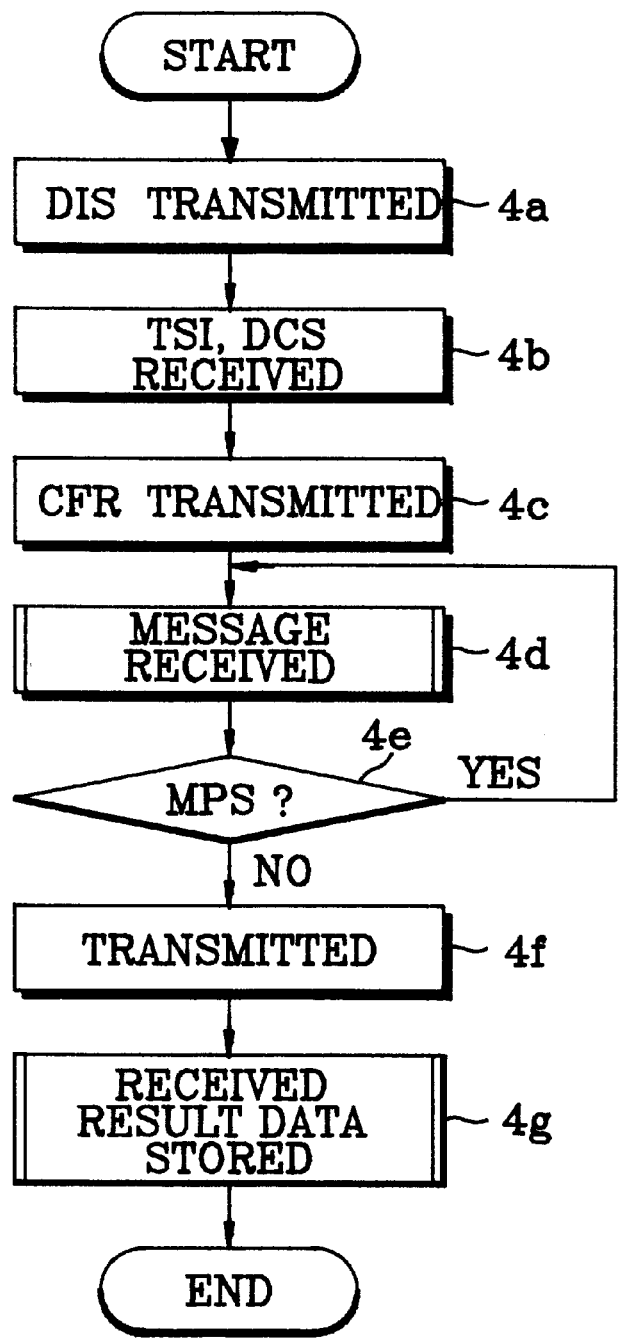
FIG. 4 is a flow chart showing the make up of the facsimile receiving procedure according to the present invention.

FIG. 3 illustrates a received image result recording pattern of the facsimile according to the present invention. FIG. 4 is a flow chart of the facsimile receiving procedure according to the present invention. This procedure is executed by the facsimile at the receiving end. If a facsimile call is received from a transmitting party, the facsimile machine of the receiving party connects itself to the calling line, and transmits a DIS (digital identification signal) to the transmitting facsimile at step 4a. In response, the facsimile of the transmitting party transmits a DCS (digital connect signal) and a transmitting subscriber identification (TSI) in which the transmitting party's own facsimile number or ID is loaded. Then at step 4b, the facsimile of the receiving party receives the TSI and the DCS so as to store the TSI into a TSI data area and so as to store the receipt starting time (time and date). Then at step 4c, in a response to the TSI and DCS data from the facsimile of the transmitting party, the facsimile of the receiving party transmits CFR (confirmation) signals, so that the status of the line would be made available to the transmitting party. Thereafter, when a message is transmitted from the facsimile of the transmitting party, it is received by the facsimile of the receiving party at steps 4d and 4e. At step 4e, in the case where a plurality of pages of text papers are received, a check is made as to whether the relevant signals have been received. In the case where a single page of text paper is received, MCF (message confirmation) signal is transmitted to the facsimile of the transmitting party at step 4f, and the received image result data are stored at step 4g.

Figure 5A:
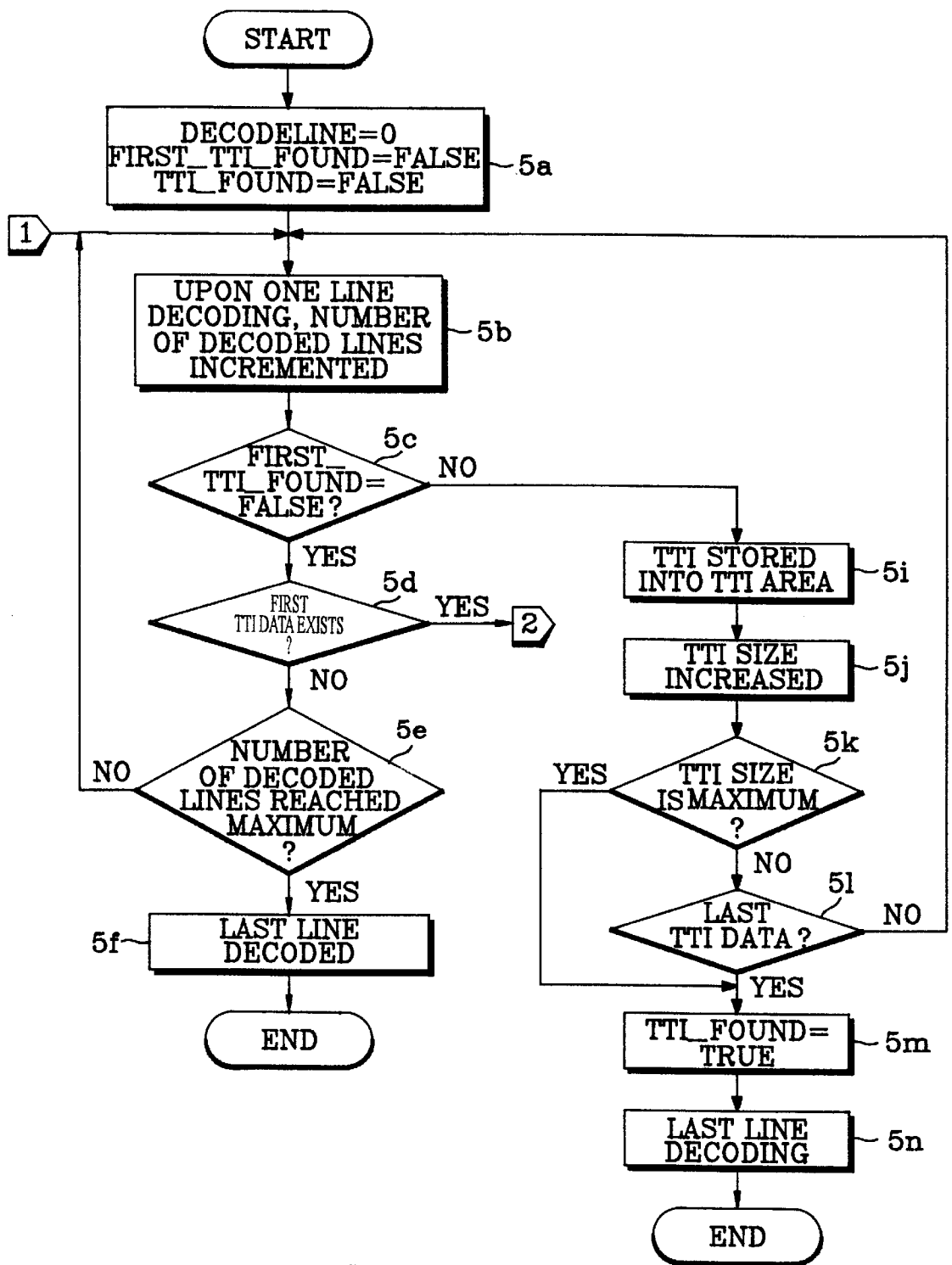
FIGS. 5A and 5B is a flow chart showing the make up of the TTI search procedure for the received message of FIG. 4.
Figure 5B:
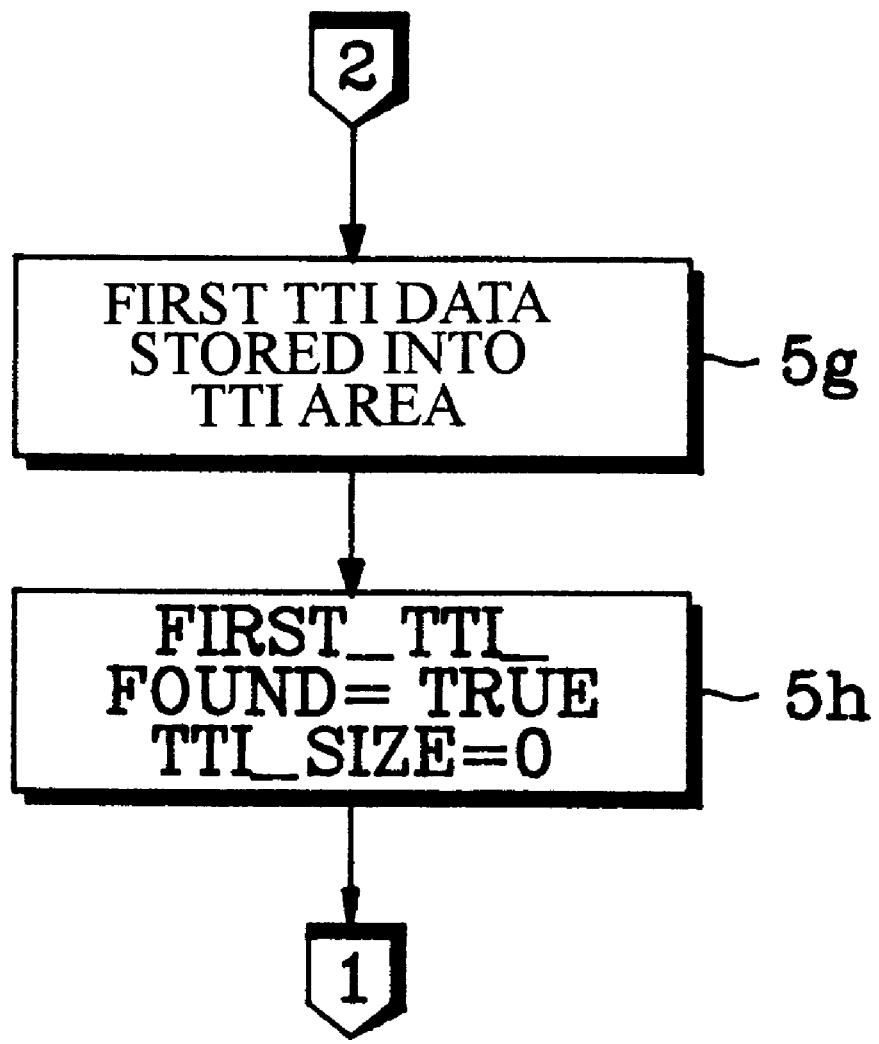

FIGS. 5A and 5B together form a flow chart showing the TTI search procedure for the received message of FIG. 4. The TTI search is carried out simultaneously with the receiving of the message. At step 5a, an initialization is carried out, and this is for making ready for the case where the TTI does not exist in the facsimile. That is, in this case, the TTI is formed by utilizing the conventional TSI. Here, the "DECODE LINE" is a flag for checking the maximum allowable number of the lines when the TTI is searched. The "FIRST-TTI-FOUND" is a flag for perceiving where the true TTI exists, because the first several lines of the TTI consist of white lines. At step 5b, one line is decoded. Data received through the modem is converted into a (MH, MR, or MMR) bit map form, while the output has also a bit-map form. After the above operation, the decoding lines are increased.

At step 5c, a check is made as to whether the initial portion of the TTI is searched, that is, a check is made as to whether the true TTI data exists. The condition for the true TTI is that all the decoded data so far should not be white, but that black data should be more than the minimum number in an overall view.

At step 5d, a check is made as to whether a TTI overall data exists. That is, at this step, it is perceived as to whether the transmitting party has sent the TTI. In spite of the fact that the receiving has been made more than the maximum receiving lines, if an effective TTI has not been received, it is decided that the TTI does not exist.

At steps 5e and 5f, a final decoding is carried out. That is, the message other than the TTI is processed, and the decoding is continued until an RTC (return to control) is captured.

Meanwhile, after making the confirmation at the step 5d, if a first TTI exists, the system advances to step 5g at which the data are stored into a TTI area. At step 5h, the flag "FIRST-TTI-FOUND" is switched to "TRUE", and the size of the TTI is initialized. Then the system returns to the step 5h to continue the decoding. Here, the size of the TTI is given a certain limit, and the TTI as much as the maximum TTI size is taken as valid.

Meanwhile, after the confirmation at the step 5c, if a true TTI exists, the system proceeds to step 5i at which the decoded one line, i.e., the TTI data are stored into the TTI area. Then at step 5j, the size of the TTI is increased as much as one unit. Then the system proceeds to step 5k at which a checking is made as to whether the maximum allowable TTI size is exceeded. If it is exceeded, then it is judged that the TTI has been found. Then the system proceeds to step 5m at which the flag "TTI-FOUND" is switched to "TRUE". At step 5n, the remaining lines are decoded until the RTC is detected.

On the other hand, if the TTI size does not exceed the maximum allowable value, the system proceeds to step 5*l* at which it is checked as to whether it is the last TTI data. If it is confirmed that it is the last TTI data, then the system returns to the step 5*m*. However, if it is not the last TTI data, the system returns to the step 5*b*. The checking as to whether it is the last TTI data is carried out in the following manner. That is, a checking is made as to whether the minimum data lines exist, and if it does not exist as much as the minimum black data, then it is judged to be the last TTI data.

Figure 6:
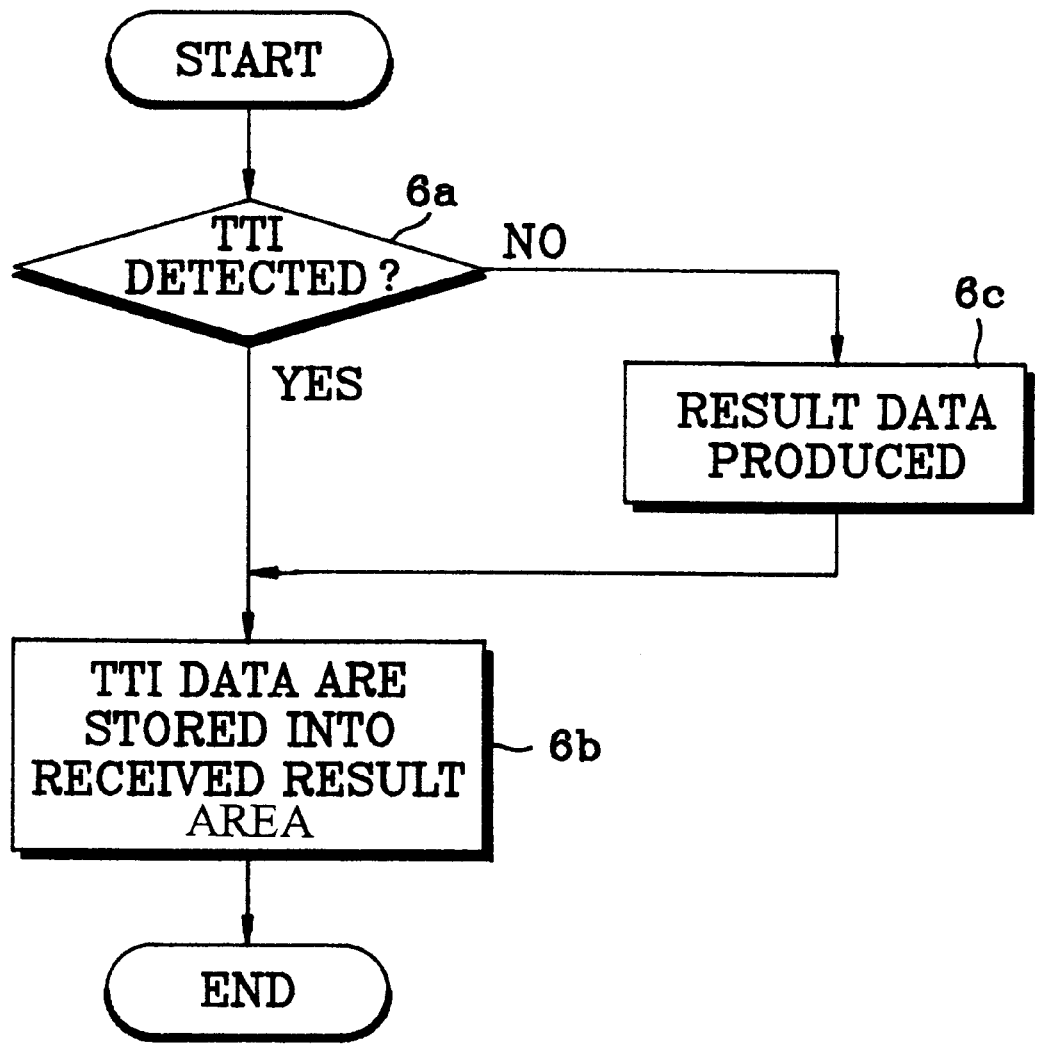
FIG. 6 is a flow chart showing the make up of the received result data storing procedure of FIG. 4.

FIG. 6 is a flow chart showing the received result data storing procedure of FIG. 4. At step 6*a*, the flag "TTI-FOUND" is checked to confirm as to whether a TTI exists within the received message. If it is confirmed that a TTI exists, then the system advances to step 6*b* at which the data is stored into the received result area. On the other hand, if there is no TTI, then system advances to step 6*c* at which pseudo TTI result data are formed. That is, the receiving starting time, the number of pages and the facsimile number/ID are combined to form a bit-map. This bit-map is stored into the TTI area, and this is stored again into the received result area. Here, the storing into the received result area is made in the form of a bit-map. If the storing area is insufficient, a compression of the data may be carried out.

Figure 7:
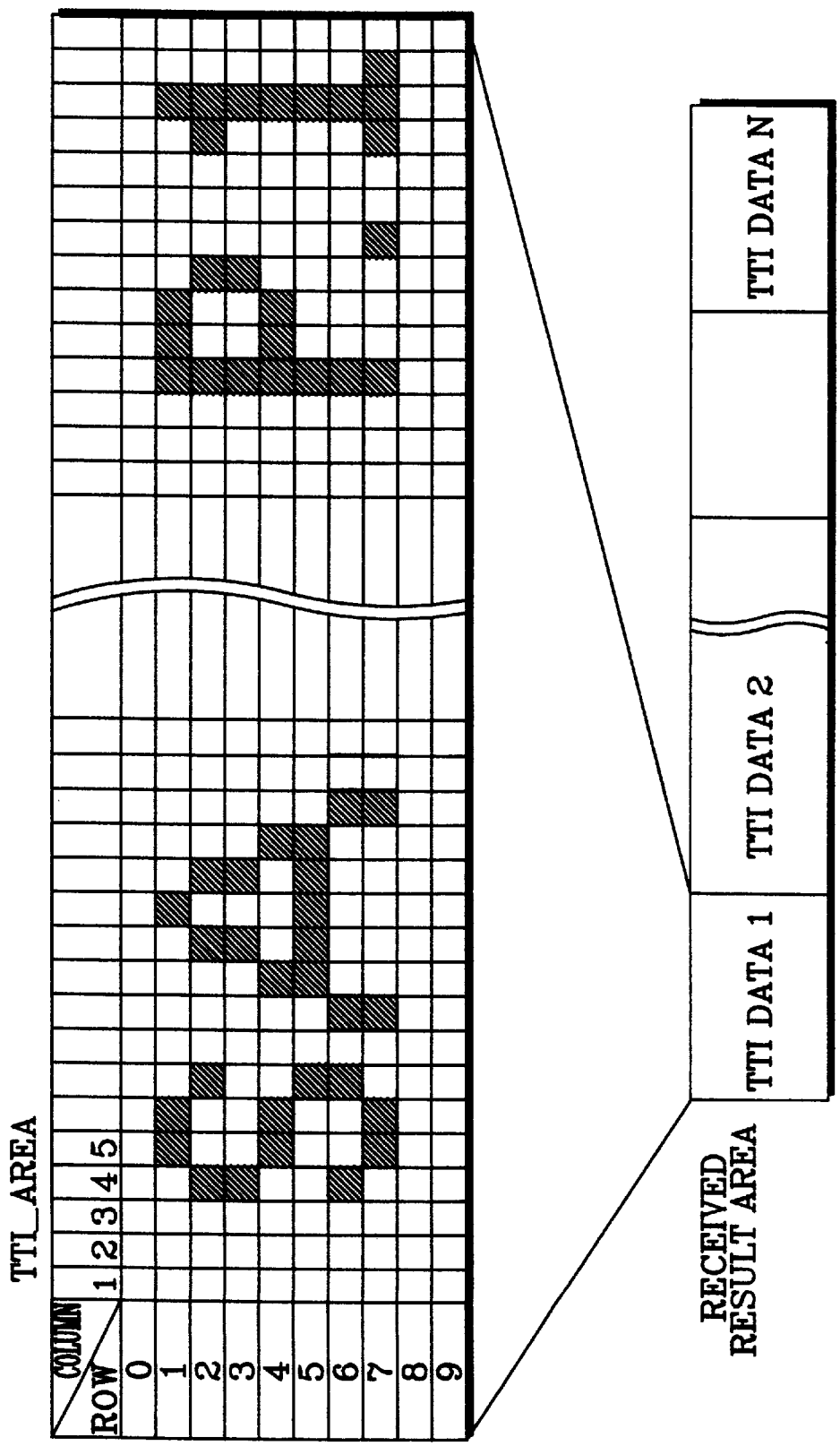
FIG. 7 illustrates the pattern of the received result data memory according to the present invention.

FIG. 7 illustrates the pattern of the received result data memory according to the present invention. The memory includes the above mentioned TTI area and received result area.

According to the present invention as described above, the facsimile number and ID can be recorded in languages of different countries, and all the characters (positions) of the facsimile number can be recorded. Therefore, the transmitter can be easily recognized. Further, both the telephone number and ID of the transmitter are recorded, and this also contributes to easily recognizing the transmitter by the receiver.

In the above, the description was made based on the specific embodiment, but it is apparent that various modifications can be added without departing from the scope of the present invention. Therefore, the present invention should not be limited by the described embodiment, but by the appended claims and the equivalents.

What is claimed is:

1. An apparatus for recording a received result in a facsimile, said facsimile receiving a transmitter subscriber identification and a message from a transmitting facsimile, and forming said message into a bit-map for each line, the apparatus comprising:

a detector for detecting an existence or absence of a transmitter terminal identification from said message for each line, and for detecting the transmitter terminal identification;

a generator for automatically producing a pseudo transmitter terminal identification based on the received transmitter subscriber identification upon finding no transmitter terminal identification in a relevant line;

a transmitter terminal identification memory for storing one identification selected from the transmitter terminal identification and the pseudo transmitter terminal identification;

a received result data memory;

a printer for printing the received results;

a receiver for inputting a received result reporting command, said reporting command corresponding to a request for a printing of the received results; and a controller for reading one identification selected from the transmitter terminal identification and the pseudo transmitter terminal identification from said transmitter terminal identification memory upon completion of the transmitter terminal identification search in each page and in each line, sending the read transmitter terminal identification to said received result data memory, and sensing an input of the received result reporting command to read the stored data of said received result data area so as to send the read data to said printer.

2. The apparatus as claimed in claim 1, said receiver comprises button keys.

3. A method for receiving text pages from a transmitting facsimile, and for storing the received pages in a memory, comprising the steps of:

connecting a transmission line upon receiving a call signal from the transmitting facsimile, and then transmitting a digital identification signal to the transmitting facsimile;

receiving transmitting subscriber identification signals from the transmitting facsimile together with one of either its own facsimile number or ID and storing them into a transmitting subscriber identification area of the memory;

forming the received message into a bit-map for each line;

checking as to an existence or absence of a transmitting terminal identification, said checking not being performed by the transmitting facsimile;

storing the transmitting terminal identification into a transmitting terminal area of said memory upon finding a transmitting terminal identification;

automatically forming a pseudo transmitting terminal identification based on the transmitting subscriber identification upon the finding of no transmitting terminal identification, said automatic forming not being performed by the transmitting facsimile;

storing said pseudo transmitting terminal identification into the transmitting terminal identification area; and reading one identification selected from the transmitting terminal identification and the pseudo transmitting terminal identification from the transmitting terminal data area upon completing the transmitting terminal search for each page and for each line, and storing one identification selected from the transmitting terminal identification and the pseudo transmitting terminal identification into a received result data area.

* * * * *